(12) United States Patent  (10) Patent No.: US 7,669,133 B2
Chikirivao et al.  (45) Date of Patent:  Feb. 23, 2010

(54) SYSTEM AND METHOD FOR DEVELOPING RULES UTILIZED IN A KNOWLEDGE MANAGEMENT SYSTEM

(75) Inventors: Bill S. Chikirivao, Denver, CO (US); Jeff A. Livesay, Houston, TX (US)

(73) Assignee: Wellogix Technology Licensing, LLC, Houston, TX (US)

( * ) Notice: Subject to any disclaimer, the term of this patent is extended or adjusted under 35 U.S.C. 154(b) by 812 days.

(21) Appl. No.: 10/125,120

(22) Filed: Apr. 17, 2002

(65) Prior Publication Data

US 2003/0163783 A1  Aug. 28, 2003

Related U.S. Application Data

(60) Provisional application No. 60/359,923, filed on Feb. 25, 2002, provisional application No. 60/284,068, filed on Apr. 16, 2001, provisional application No. 60/284,077, filed on Apr. 16, 2001.

(51) Int. Cl.
*G06F 3/00* (2006.01)
*G06N 5/00* (2006.01)

(52) U.S. Cl. .......................................... 715/744; 706/45
(58) Field of Classification Search ................... 706/45, 706/47; 715/744
See application file for complete search history.

(56) References Cited

U.S. PATENT DOCUMENTS

| | | | | |
|---|---|---|---|---|
| 5,107,500 A | | 4/1992 | Wakamoto et al. | 371/15.1 |
| 5,168,445 A | * | 12/1992 | Kawashima et al. | 705/10 |
| 5,446,885 A | * | 8/1995 | Moore et al. | 707/103 R |
| 5,450,545 A | | 9/1995 | Martin et al. | 395/700 |
| 5,487,135 A | | 1/1996 | Freeman | 395/75 |
| 5,537,590 A | | 7/1996 | Amado | 395/600 |
| 5,630,127 A | | 5/1997 | Moore et al. | 395/615 |
| 5,694,525 A | | 12/1997 | Yamashita | 395/61 |
| 5,701,400 A | | 12/1997 | Amado | 395/76 |
| 5,761,389 A | | 6/1998 | Maeda et al. | 395/75 |
| 5,802,255 A | | 9/1998 | Hughes et al. | 395/75 |
| 5,826,252 A | | 10/1998 | Wolters, Jr. et al. | 707/1 |
| 5,940,815 A | | 8/1999 | Maeda et al. | 706/12 |

(Continued)

OTHER PUBLICATIONS

Alter, Steven, "A General, Yet Useful Theory of Information Systems", Communications of the ACM, Mar. 1999, pp. 1-70.*

(Continued)

*Primary Examiner*—Laurie Ries
(74) *Attorney, Agent, or Firm*—Matthews, Lawson & Bowick PLLC (57) ABSTRACT

A system and method for developing rules for validating a process having one or more parameters. The system or method may be used with a knowledge management system to validate the process. In one example, one or more rules are created to be used to validate the process, and the one or more rules are stored in a repository. One or more parameters relating to the process are obtained, one or more rules associated with the process are obtained from the repository, and the one or more rules obtained are used to validate the one or more parameters of the process. If the one or more parameters comply with the one or more rules, an indication thereof may be provided. Or if the one or more parameters do not comply with the one or more rules, an indication thereof may be provided.

43 Claims, 3 Drawing Sheets

U.S. PATENT DOCUMENTS

| | | | |
|---|---|---|---|
| 6,016,477 | A | 1/2000 | Ehnebuske et al. ............. 705/7 |
| 6,216,109 | B1 | 4/2001 | Zweben et al. ................. 705/8 |
| 6,223,092 | B1 | 4/2001 | Miyakawa et al. .......... 700/103 |
| 6,236,978 | B1 | 5/2001 | Tuzhilin ...................... 705/26 |
| 6,272,482 | B1 | 8/2001 | McKee et al. ................. 706/47 |
| 6,308,162 | B1 | 10/2001 | Ouimet et al. ................. 705/7 |
| 6,321,217 | B1 * | 11/2001 | Maeda et al. ................. 706/47 |
| 6,704,743 | B1 * | 3/2004 | Martin .................... 707/103 R |
| 6,741,975 | B1 * | 5/2004 | Nakisa et al. ................. 706/47 |
| 6,820,069 | B1 * | 11/2004 | Kogan et al. .................. 706/46 |
| 2001/0051913 | A1 | 12/2001 | Vashistha et al. ............. 705/37 |
| 2002/0032723 | A1 | 3/2002 | Johnson et al. ............. 709/203 |
| 2002/0049691 | A1 * | 4/2002 | Majoor ........................ 706/47 |
| 2003/0055815 | A1 * | 3/2003 | Chender et al. ................ 707/3 |
| 2003/0154144 | A1 * | 8/2003 | Pokorny et al. ............... 705/28 |
| 2004/0039720 | A1 * | 2/2004 | Hodges et al. ................. 707/1 |

OTHER PUBLICATIONS

Wicklund, Gary A, et al, "Expert Systems in Insurance Underwriting: Model Development and Application", Proceedings of the Conference on the 1987 ACN SIGBDP-SIGCPR Donference, Mar. 1987, pp. 129-139.*

Nord, G. Daryl, "A Prototype of a Rule-Based Expert System Designed for Psychological Analysis", Proceedings of the 1990 ACM SIGBDP Conference on Trends and Directions in Expert Systems, Sep. 1990, pp. 573-578.*

Duggal, Sudesh M., et al, "An Example of Management Training in Expert Systems: SBA Loan Evaluation System", Proceedings of the 1990 ACM SIGBDP Conference on Trends and Directions in Expert Systems, Sep. 1990, pp. 588-618.*

Chen, Yong C., et al, "Expert System for Blast Furnace Operation", Proceedings of the Third International Conference on Industrial and Engineering Applications of Artificial Intelligence and Expert Systems—vol. 1, Jun. 1990, pp. 569-576.*

Preece. A.,, et al, "Better Knowledge Management Through Knowledge Engineering", IEEE Intelligent Systems, 2001, pp. 36-43.*

* cited by examiner

FIGURE 3

SYSTEM AND METHOD FOR DEVELOPING RULES UTILIZED IN A KNOWLEDGE MANAGEMENT SYSTEM

CROSS REFERENCE TO RELATED APPLICATIONS

This application claims priority under 35 U.S.C. 119(e) to U.S. provisional patent application Ser. No. 60/359,923 filed Feb. 25, 2002 entitled "OPERATIONAL EVENT SUMMARY" the disclosure of which is hereby incorporated by reference in its entirety. This application is further related to U.S. provisional patent application Ser. No. 60/284,068 entitled "SYSTEM AND METHOD FOR MANAGING KNOWLEDGE INFORMATION" filed Apr. 16, 2001, and to U.S. provisional patent application Ser. No. 60/284,077 entitled "SYSTEM AND METHOD FOR DEVELOPING RULES UTILIZED IN A KNOWLEDGE MANAGEMENT SYSTEM" filed Apr. 16, 2001, the disclosures of which are hereby incorporated by reference in their entirety.

FIELD OF THE INVENTION

The present invention relates generally to the field of knowledge based management systems for complex operations and/or procedures. The invention further relates to the field of creating rules utilized by knowledge management systems to control such complex operations and/or procedures.

BACKGROUND OF THE INVENTION

Expert based systems, and in particular knowledge management systems, utilize the knowledge provided by one or more human experts in a field and store it so that such knowledge is readily available and accessible. Expert systems are usually designed to be an "expert" in a very narrow field because of the amount of information required to establish such expertise. Administrators of such expert systems may have difficulties with keeping such knowledge current and accurate. Expert systems are commonly utilized today in various fields, including medicine, meteorology, capital market modeling, financial credit analysis, and various other complex fields and operations. Expert systems contain acquired expert knowledge and attempt to imitate an expert's thought processes so as to offer a solution to a problem. Academics consider expert systems to be a subset of the larger field of artificial intelligence.

Expert systems commonly contain two components: a knowledge or rule base and an inference or rules engine program. The knowledge/rule base is programmed as a series of rules such as "IF . . . THEN" statements or other logical, financial, mathematical, functional, temporal and/or relational statements. An example of a rule may be: "IF the animal is a bird, AND it does not fly, AND it swims, AND it is black and white, THEN it is a penguin."

The knowledge/rule base provides the storage location of the knowledge of one or more human experts in a specific field or task. The knowledge/rule base is usually made up of factual knowledge and heuristic or "rule of thumb" knowledge. Factual knowledge typically consists of information that is commonly shared and is quite often found in textbooks or journals, and is typically agreed upon by humans knowledgeable in a specific field or task. Heuristic knowledge is knowledge gained from experience and may include, for example, actual data and/or statistical representations of actual data.

The inference or rule engine of an expert system is usually configured to mimic the reasoning and problem solving ability that the human expert would utilize to arrive at an answer or conclusion to a given problem. In short, the inference/rule engine is that element of an expert system which analyzes information utilizing the knowledge/rule base established by the experts and/or the actual data.

To date, most expert systems have utilized a given set of rules for each specific task, client, process, environment or any other variable. As such, expert systems for specific tasks have become commonly available. Further, when an expert system is implemented for a small client base or a limited number of tasks and/or activities, the expert systems can often be efficiently and conveniently updated. However, when the same expert system is applied across multiple players and industry groups, the creation, maintaining and updating of the rules utilized by such systems become problematic, because each player in such field may desire to utilize different and/or customized rules. Such rules may be specified by the customer or any one of the plurality of "experts" that commonly exist in a given industry, field or endeavor. In short, there often is no single best practice that is commonly accepted by everyone in a given field.

As a result, administrators of expert and other rule based systems are often forced to either maintain large staffs of experts who can create, monitor and update the various rules (and all their infinite iterations) for a plurality of customers or to not provide client specific and/or customized rules and instead utilize a limited set of standardized rules (when such standards exist).

Thus, there is a need for a system and method which enables clients, system administrators, and others to create and access rules which are current and up-to-date while taking into consideration specific needs and preferences of a multitude of users and experts.

It is against this background that various embodiments of the present invention were developed.

SUMMARY OF THE INVENTION

According to one broad aspect of one embodiment of the present invention, disclosed herein is a system and a process which allows users of a business system—which may include or be utilized in conjunction with a knowledge based management system—to create and implement customized rules based on data intelligence gathered from a repository or database of information. The system may allow users of a knowledge based management system to implement best practices of business and engineering policies, select complex industry products and services (for example, those provided in the oil and gas industry), monitor costs of projects and processes, automate work flows and approval processes, and improve almost any other process which is capable of repetition.

Further, in another embodiment, a "Rules" system is disclosed herein, which may include a rule repository, a rule builder, and a rule server. By utilizing the dynamic rules based processing capabilities of the Rules system of one embodiment of the present invention, knowledge transfer and utilization of such knowledge can be improved throughout a given field (for example, the oil and gas industry). Such a system may improve the efficiency, accuracy and promotes the best practices for any relationship or activity capable of being defined by or impacted by a rule. Such relationships and practices may include those between suppliers and users, customers and service providers, and other business relationships. These improved relations may result in greater efficiencies to end users, such as, shortened sales and payment cycles, decreased personnel training times and costs, decreased data input and interpretation errors and improved maintenance and troubleshooting procedures.

According to one broad aspect of another embodiment of the present invention, disclosed herein is a method for developing rules for validating a process having one or more parameters. The method may be used with a knowledge management system to validate the process. In one example, the method includes creating one or more rules utilized to validate the process, storing the one or more rules in a repository, and obtaining the one or more parameters relating to the process. The one or more rules associated with the process are obtained from the repository, and the one or more rules obtained are used to validate the one or more parameters of the process.

In one embodiment, the knowledge management system may contain one or more industry standards, government regulations, and/or historical data related to the process, and the creating operation accesses the knowledge management system to create the one or more rules based in part on the one or more industry standards, government regulations, and/or historical data. Further, the method may include comparing the one or more parameters of the process to the one or more rules associated with the process, and if the one or more parameters comply with the one or more rules, providing an indication thereof. Or if the one or more parameters do not comply with the one or more rules, an indication thereof may be provided. In one embodiment, an administrator may modify the one more rules to form one or more modified rules and store the one or more modified rule in the repository as new rules or to replace the one or more original rules.

According to one broad aspect of another embodiment of the present invention, disclosed herein is a system for developing rules utilized in a knowledge management system for validating a process having one or more parameters. The system may include a builder module for creating one or more rules utilized to validate the process, a repository for storing the one or more rules, and a server. In one example, the server obtains the one or more parameters relating to the process and retrieves the one or more rules associated with the process from the repository. The server may utilize the one or more rules to validate the one or more parameters of the process.

In one embodiment, the one or more rules include one or more customizable rules having variable data fields. Further, the builder module may permit an administrator to build the one or more rules based on one or more industry standards, government regulations, and/or historical data related to the process. The repository may be implemented as a relational database.

Further, in another embodiment, the Rules system may enable providers of business systems and/or knowledge based management systems to provide rules desired by individual users (customers) of such knowledge based management system without requiring the system administrator to constantly modify the specific rules utilized by each specific customer. In one embodiment, the Rules system provides and allows the creation of interfaces by which customers can input their own business rules into the Rules system with and/or without system administrator interaction. Such rules are then utilized by the knowledge based management system as necessary. As such, in one embodiment, a Rules system is disclosed which is efficient to utilize and maintain and may be as up-to-date and current as often as a customer so provides and/or desires.

In another embodiment of the present invention, a Rules system may include a rule builder which allows administrators to create specific rules and/or user customizable rules. Non-administrator users can then access such customized rules to create rules customized for their specific activity, project, business, field or any other specialization by utilizing predetermined best practices templates that contain customizable parameters and/or field specifications. Such best practices templates are preferably created based upon statistical, logical, and other analyses of historical and new data, standards, regulations and other information for the given project or task to which the rule is directed. Such customized rules may be created by the customer, the user, the administrator of the Rules system or anyone else with the appropriate access and authorizations.

Further in another embodiment, a Rules system may include a rule repository in which rules, templates, variables, parameters, and other information are suitably stored. The Rules system may also have access to other databases, for example, business system and/or knowledge based management system databases as necessary.

In another embodiment, a Rules system may include a rule server. The rule server provides those features and functions necessary to create and utilize rules by themselves and/or in conjunction with other systems including, but not limited to, knowledge based management systems. The rule server preferably includes those interfaces necessary to connect to the knowledge based management system and/or allow users to access the rules provided or accessible by the rule server.

Various embodiments of the present invention may be embodied as computer program products including a computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following more particular description of embodiments of the invention as illustrated in the accompanying drawings.

DETAILED DESCRIPTION

Figure 1:
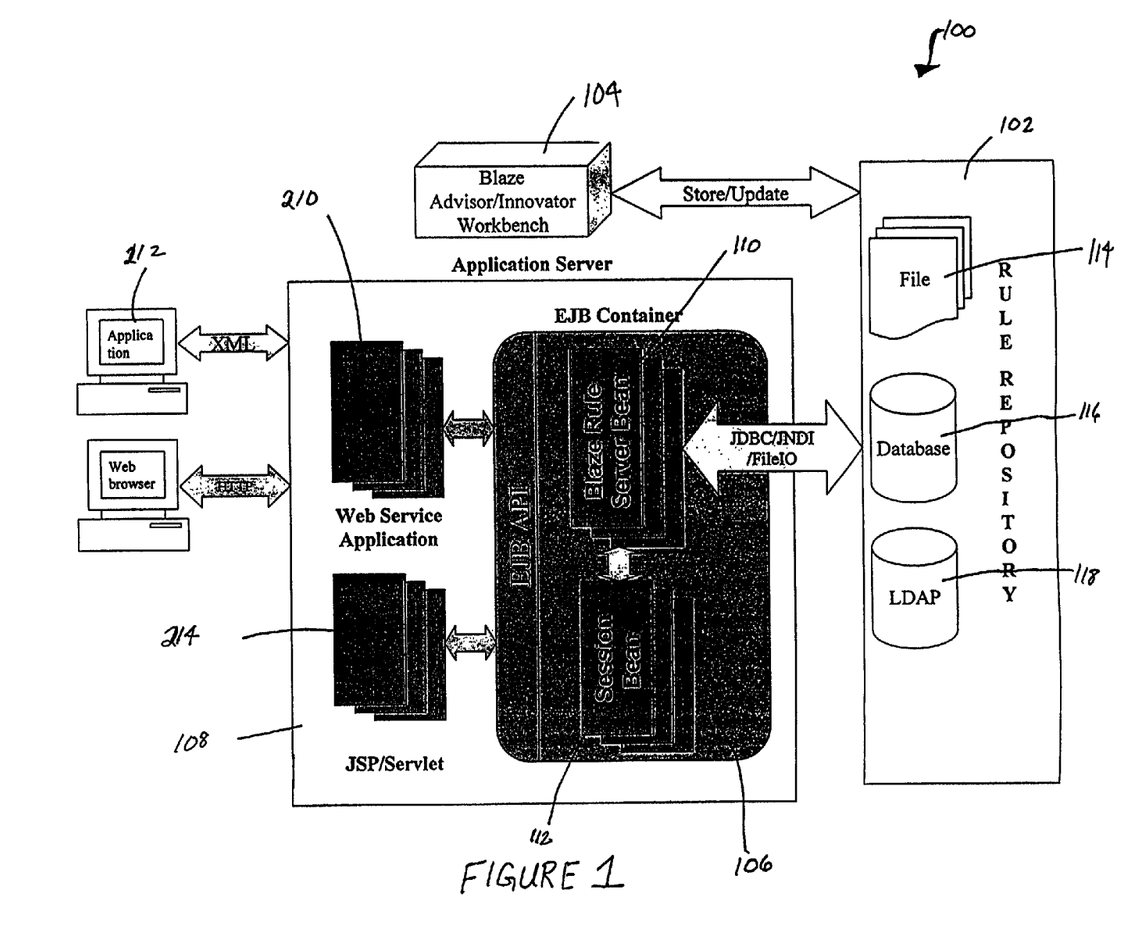
FIG. 1 provides a schematic representation of an embodiment of a Rules system, in accordance with one embodiment of the present invention.

As shown in FIG. 1, according to one embodiment of the present invention, a system 100 includes a rule repository 102, a rule builder 104 (which is preferably implemented by utilizing a Blaze Advisor/Innovator Workbench™), and a rule server 106. Such a system is referred to herein as a Rule system 100, although the presence or absence of 102, 104, and 106 may depend upon the particular implementation. The various other components and elements shown in FIG. 1 are additional to and/or are utilized to interface with and receive/provide data from/to the Rule system 100. Such additional components and elements include the web service application 210, JSP servlets 214, and the web browsers 212 utilized by users of a knowledge based management system utilized in conjunction with a business system, wherein the knowledge based management system and at least one element of the Rules system are hosted on an application server 108 or a plurality of interconnected servers. Those skilled in the art appreciate that a computerized system may be hosted on a single physical server (with numerous virtual instantiations of servers) or a plurality of physical servers which are suitably interconnected. As such, the precise configuration and system embodiments of the present invention are described in terms of functional components which may be suitably provided on any well known configuration of server(s) and/or other systems.

Figure 2:
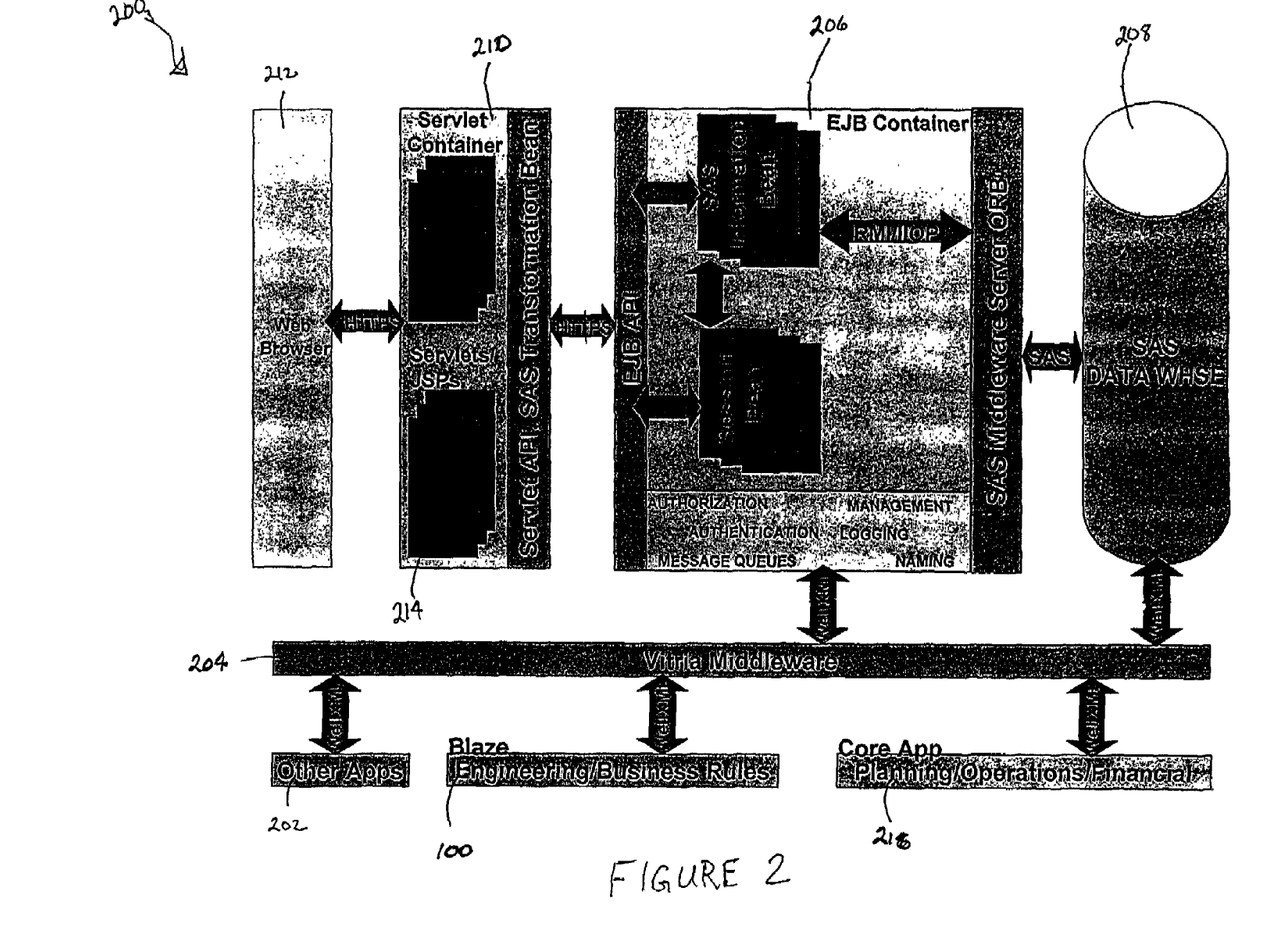
FIG. 2 provides a schematic representation of a utilization of a Rules system in the context of a larger knowledge based management system, in accordance with one embodiment of the present invention.

Further, as shown in FIG. 2, the Rules system 100, may be suitably provided in the context of a business management system 200, for example, the one provided by the Wellogix Inc. web site www.wellogix.com. One example of an embodiment of a business management system 200 is described in U.S. patent application Ser. No. 09/672,938, entitled "Process and System for Matching Buyers and Sellers of Goods and/or Services," filed on Sep. 28, 2000, the disclosure of which is hereby incorporated by reference herein.

In one embodiment, the business management system 200 includes the web browser 212, web service application 210, JSP servlets 214, knowledge management data server 208 (for example, an SAS data warehouse), server 206, Vitria™ middleware layer 204, other applications 202 (which may include data and/or routines received from users and others necessary to implement a knowledge based management system), and the planning and financial tools 216. Various elements of such components are also described in the following U.S. utility and provisional patent applications, the contents of which are herein incorporated by reference, including: U.S. patent application Ser. No. 09/801,016 filed on Mar. 6, 2001, entitled "Method and Process for Providing Relevant Data, Comparing Proposal Alternatives, and Reconciling Proposals, Invoices, and Purchase Orders with Actual Costs in a Workflow Process"; and U.S. Provisional Patent Application Ser. No. 60/283,701 filed on Apr. 12, 2001, entitled "Data-type Definition Driven Dynamic Business Component Instantiation and Execution" and its corresponding non-provisional application Ser. No. 10/121,310 filed Apr. 12, 2002.

Referring again to FIG. 1 and as mentioned previously, the Rules system 100 preferably includes a rule builder 104. In the preferred embodiment, such rule builder utilizes tools and features provided by the Blaze Advisor Innovator software programs which may be obtained at www.blazesoft.com. The Blaze Advisor Builder program enables rules administrators or other authorized users (for example, a corporate user's designated representative may be a rules administrator) of the Rules system 100 to quickly and easily capture rules and expertise that reflect an industry's, field's or even a company's business, engineering, financial and other practices and express such rules in a visual development environment. The visual development environment enables such administrators to define, edit and test the rules prior to their use by other authorized users (for example, drilling engineers employed by an energy resources company with whom the rules administrator is affiliated). Preferably, the Rules system 100 is configured with Version 3.2 of the Blaze Advisor suite of programs. Further, any rules created by an administrator are preferably saved in the rule repository 102. A first example of a rule created by the present invention may include:

Rule Example 1

If oil basin is located in section 45 of township 16 in Butler county Kansas then water table rises to a height no greater than 1000 feet above sea level.

In this example, such a rule is drafted as a definitive rule in which no variables of the rule may be changed or modified. However, the Rules system 100 may also support the creation of customizable rules which are generated based upon historic data, standards, regulations, and other information and are determined based upon parameters specified (or selected from, for example, a drop down menu) by a user. An example of the above rule reformatted in such a customizable rule format is:

Rule Example 2

If oil basin is located in (user inputs geographic location) in (user inputs county), (user inputs state) then water table rises to a height no greater than (data determined by Rules system based upon information contained in rule repository, knowledge based management system, business system and/or other databases as identified by appropriate designations of locations of such information and/or sub-rules needed to make such determinations), feet above sea level.

Thus, the rule builder 104 enables a rule administrator to create specific rules and/or customizable rules. Such rules may be designed with any level of interactivity and/or user knowledge required and may include and utilize data and other information stored in the rule repository 102 and/or other databases and applications, including, but not limited to the business management system 200, the web service application 210, and/or other knowledge based management systems. It is to be appreciated that rules may be created such that they utilize other rules. As such, a relational database of rules may be created in the rules repository 102 which enable a user to determine whether any given process, task, proposal or the like is within the parameters of "best practices" as defined by the historical data and other information captured in a given set of rules.

Further, the Rules system 100 may also utilize the Blaze Innovator program to provide an interface (i.e., via the rule builder 104) by which a user (for example, a drilling engineer) may utilize rules created by the rules administrator. It is to be appreciated that such interface is preferably provided via a web browser 212 and hosted on an application server 108. Therefore, the components identified herein for the Rules system 100 of the present invention are commonly software components that may be provided on a single or a plurality of servers over various network connections including, but not limited to, the Internet and other intranets.

Further, as shown the in Rule Example 2 above, the rules administrator may create a rule which requires the user to provide inputs as to specific needs (for example, where an oil well is to be drilled). The rule builder 104 suitably utilizes the Blaze Innovator program to enable users to create customized rules for specific tasks, projects, areas, endeavors, or the like. In short, the customizable rules may be modified to fit specific business policies and procedures. Such customized rules may be suitably saved in the rules repository 102. The rules repository 102 may include data files 114, databases 116 and/or Logical Data Application Programs (LDAP) 118 which contain those pre-created data and/or rules utilized by a specific application of the Rules system 100.

In one embodiment, the Rules system 100 also includes the rule server 106. The rule server 106 (which, as is commonly appreciated, may be located on a physically separate server from the other elements of the Rules system 100 or as a logical instantiation of a server hosted, for example, on an application server 108) preferably includes a rule server bean 110 and a session bean 112. The session bean 112 is utilized to establish a rule requesting session on a server. Server sessions are commonly known in the art and are not described in detail herein. The rule bean 110 preferably utilizes the Blaze Advisor Rule Server and Engine to process any business rules (which have been earlier created by the rules administrator or retrieved and customized by another user) needed to determine whether a given operation, proposal, task, description, analyses, or the like complies with pre-established business rules. More specifically, the Blaze Advisor Rule server and Engine eliminates nearly all of the programming and system downtime associated with adapting to change, while providing fast response and high availability for multitudes of users across a given business system. Preferably, the Blaze Advisor version 3.2 suit is utilized as it is compatible with J2EE systems.

Figure 3:
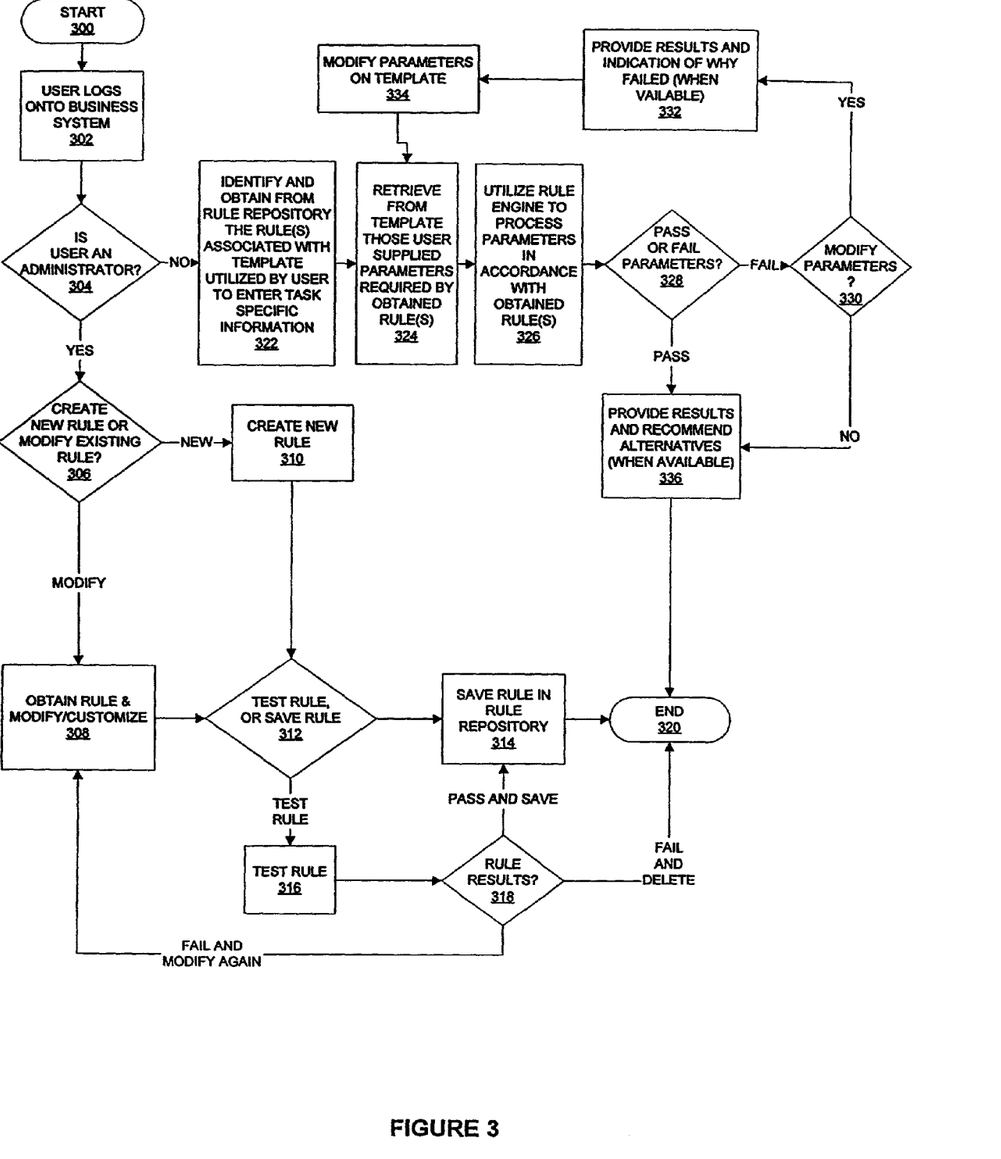
FIG. 3 provides a flow diagram illustrating process steps by which a user may configure a rule to be utilized by a specific knowledge based management system or other system, in accordance with one embodiment of the present invention.

The process by which the Rules system 100 is preferably utilized as shown in FIG. 3. As shown, the process preferably begins when an authorized user accesses a system (for example, a business system) hosting or otherwise providing access to the Rules system 100. As shown the user suitably logs onto the system (which may, for example, be a stand-alone instantiation of the Rules system 100 or included within a larger business system and/or knowledge based management system) (step 302). Based upon the user's authorizations and classification, the Rules system 100 then determines whether the user has logged onto the system as an administrator (i.e., a person with authorization to add, delete and/or modify rules) (step 304). It is anticipated that a given user of sufficient authorization (for example, a supervisory engineer) may access the Rules system 100 at various instances as either a user or an administrator (depending upon the function they are then performing). As such, the Rules system 100 recognizes users authorization levels and based upon the function desired allows the user to access the system 100 at the appropriate level of control and security. For example, a supervisory engineer may have access to rules relating to oil drilling but not to financial rules.

If the user is an administrator, the processing then continues with querying the administrator as to whether they desire to create a new rule or modify an existing rule (step 306). If the user selects to create a new rule, then the rule builder 104 suitably presents those interfaces provided by the Blaze software programs which enable a user to create such new rule (step 310). The new rule may then be saved and/or tested before being saved (step 312).

If the user desires to modify an existing rule (or create a customized rule based upon a pre-existing customizable rule template saved in the rule repository 102, for example), the system obtains the rule and provides those interfaces necessary to allow the user to modify/customize the rule (step 308). Processing then continues with either testing the rule or saving the rule (step 312).

If the rule (either new or modified) is to be tested, the Rules system 100 utilizes the rules server 106 to test the rule. The administrator may supply specific variables to test the rule, or, when possible, the rule server 106 may obtain information from the rule repository 102 and/or other databases to test the rule. It is to be appreciated that depending upon the complexity and novelty of a given new or modified rule, greater degrees of administrator may need to specify more or less information to test a given rule.

The rule server 106 preferably generates a result of the tested rule (step 318). Regardless of the results of the test, the administrator may pass the test and save the test in the rule repository 102 (step 314) at which processing for a specific rule effectively ends (step 320). This pass and save option may preferably be selected even if the test fails, for example, when the administrator realizes that the reason the test failed was due to the providing of incorrect information or processes utilized to test the rule. However, the Rule system 100 may be configured such that only specific administrators can pass a failed test and/or save the failed test in the rule repository 102 without obtaining additional authorizations and/or approvals.

Similarly, the administrator may decide to fail and delete a passed or failed test, in which case the session effectively ends (or is returned to a previous processing screen) (step 320). An administrator may desire to delete a passed test, for example, when the actual utilization of the test is onerous (too much information required), non-timely (takes too long to process), or for a variety of reasons. Further, the administrator may desire to fail a test and modify the test again by returning the processing to step 308. When the fail and modify again option is chosen, the Rule system 100 temporarily stores the previously new/modified test so that the variations between modified versions may be compared and ultimately a final version selected for saving in the rule repository 102. As such, the rule repository 102 may be configured to contain both approved/authorized rules and rules under development (which can only be accessed, for example, by authorized administrators).

Referring again to step 304, when the user is not an administrator, access to a rule may be specified manually or automatically. For example, a rule may be activated upon the entering and saving of data into a template provided by a business system and/or a knowledge based management system. Once the rule system 100 is activated, processing preferably continues with identifying and obtaining from the rule repository 102 the rule(s) (i.e., any single template or data entry may trigger the activation of multiple rules) associated with the template utilized by the user to enter task specific information (step 322). It is to be appreciated that in the preferred embodiment, the Rules system 100 is utilized in conjunction with an automated business system which provides templates and other features that enable a user to expeditiously enter the necessary information required for a given task. Such data entries may also be accomplished by providing data files which are suitably converted into an appropriate format, for example an XML format such as WellXML™ format, and then converted and manipulated by a knowledge based management system, such as a knowledge management system as disclosed in U.S. provisional patent application Ser. No. 60/284,068 entitled "System and Method for Managing Knowledge Information," incorporated by reference above.

Once the rule(s) have been identified, the Rules system 100 creates a session bean 112 on the rule server 106 and activates a rule server bean 110 (which, for example, may be an instantiation of the Blaze Advisor Rule Engine discussed above). The rule server bean 110 suitably examines the rule (obtained from the rule repository 102) and extracts from the provided information those parameters required by the rule(s) (step 324). The rule engine is then utilized to process the extracted parameters in accordance with the obtained rule(s) (step 326).

At this point of the process, the Rule system 100 has identified the rule(s) needed for a given task and examined the provided information (i.e., the parameters) in light of such rules to determine whether the proposed task is acceptable (i.e., passes rules validation) or not acceptable (i.e., fails rules validation) (step 328). If the provided information passes the rules validation, the business system processing suitably continues with providing the results and recommending alternatives (when such capability is available and/or selected) (step 336). Rules processing of the user inputted information then effectively ends (step 320).

Referring again to step 328, however, when the rules processing returns a fail result, the user is then presented the option of modifying the parameters (step 330). The Rules system 100 may provide suggestions/alternative parameters to utilize in the provided information or may not. As such, any level of expert systems may be provided including highly complicated systems that recommend changes, systems which identify why a given set of information failed a rule, and systems which merely indicate that a rules validation failed but provides little if any reasoning for such failure. Those skilled in the art appreciate the databases, additional rules, and other systems and information necessary to configure a rules system for any desired level of autonomy.

In the preferred embodiment, when a rules validation fails and the user desires to modify parameters, the rules system preferably provides an indication of why the rule failed (step 332). The user may then modify the parameters (manually or automatically) on the template or other mechanism by which the information was provided (step 334). The Rules system 100 then re-validates the information using the same and/or different rule(s) based upon the new information provided.

Further, it is to be appreciated, that in modern multi-tasking environments multiple processes, including rules validation of information, may be occurring simultaneously in a business system. As such, the process flow is represented herein as a linear process, however it may be a non-linear process as particular needs dictate and specific applications of the present invention require.

As such, the Rules system 100 provides a system and process which ensures the transfer of best practices, procedures, and policies are utilized by a business system across an industry, endeavor and/or organization. Further, the Rules system 100 enables the creation, selection, and refinement of appropriate "best practices" based on prior organizational learning and/or expected operational/administrative conditions. The Rules system 100 also improves decision analysis processes, the selection of product and/or services based on various factors including, for example, environmental conditions. For example, the Rules system 100 provides best practices determinations when selecting the appropriate packer, bits, sizing of gravel pack screens, and other items utilized in a well drilling endeavor.

Further, in one embodiment, the Rules system 100 enables rules administrators to select and/or specify operations methodologies used, for example, by a specific organization based on success/failure of past experiences. Similarly, appropriate diagnostic pathways can be selected using the Rules system 100 while also ensuring compliance with business rules via the validation processes discussed herein. For example, the system may permit validating and ensuring that invoice payments are made when certain thresholds are met, and further that as information is received from the field (for example, an e-Field Ticket™ (EFT™)), it complies with contract terms. The Rules system 100 also expedites cost monitoring and approvals of operations expenditures versus budgets, for example, monitoring field costs versus estimates of well costs such as from authority for expenditures (AFEs). The Rules system 100 also provides a mechanism for creating reports and warnings that can be utilized to notify appropriate levels of management when overruns are imminent, or safety/environmental constraints are not being followed, and of other concerns or status information.

In the financial realm, the Rules system 100 also can (via the appropriate rules) ensure, for example, budget requests are timely routed to the appropriate people within an organization for approval. Similarly, EFTs™ and invoices can be automatically routed for approval and payment purposes. The Rules system 100 may also implement security and access control systems for both the business system and other systems, while providing timely access to project details and other data/information, based upon different access levels being assigned to different users based on company, organization, role and other customizable variables. In short, the Rules system 100 can be configured to monitor, verify, approve, route, check and various other operations for any data, task, request, process, or the like.

More specifically, the Rules system 100 may be utilized in an oil and gas embodiment, such as that utilized by the Wellogix, Inc. business systems described in the applications cross-referenced above. Such embodiments enables those involved in the oil and gas industry to: implement best practices; select products, validate and ensure compliance with corporate/regulatory policies; troubleshoot and diagnosis obstacles encountered; maintain equipment; and provide security and access control to sensitive information and/or processes.

More specifically, the Rules system 100 enables upstream industry clients to implement user defined best practice "rule sets" corresponding to a particular location or field. These rule sets are based on data intelligence extracted from a repository of information (for example, as described in the above referenced application "System and Method for Managing Knowledge Information") or gleaned from industry experts. As such, they allow users to utilize best practice business policies and processes and engineering rules specific to a given location. The rules can be refined according to expected operating conditions and as best practice methods change.

While many of rules will have a similar structure across different organizations, the details may vary. For example, a rule relating to the selection of a permanent or retrievable packer will have the form: "IF differential pressure is greater than 'X' psi, THEN use of a retrievable packer is not recommended." In this example, the only thing that may vary across different organizations and business units is the value selected for "X", or the threshold. This threshold may vary according to field location, engineering rules specific to the individual drilling organization and individual packer specifications. In one embodiment, as best practices and specifications are refined and improve over time, the drilling operations are able to alter the value of this and other thresholds. The Rules system 100 can provide this functionality, in one example.

The Rules system 100 also may help users select complex oil field products based on expected hole conditions and drilling parameters. As such, for operating companies, the well planning process is enhanced considerably. Vendors also can benefit by using the Rules system 100, because they are now dealing with a better-educated customer and hence benefit from shortened sales cycles. Furthermore, the Rules system 100 can be used to ensure that a vendor's sales force consistently and accurately provides their customers with the best product for the job. This may decrease sales cycle times and improve customer satisfaction.

Additionally, the Rules system 100 enables the vendors of complex oil field products and services to further differentiate their product line from those of their competitors. For example, if drilling engineers get used to using product selection software to select a particular vendor's product, then that vendor begins to enjoy a distinct competitive advantage over their competitors. This is because the cost of the buyer switching to a competitors product, which is not so easy to select, begin to increase.

The Rules system 100 may also be configured to drive or enhance the operation of accounting and payroll (A/P) systems. Using the Rules system 100, an A/P system can automate invoice and eField-Ticket™ matching and help ensure contract compliance. The Rules system 100 may also help to improve upstream oil industry A/P process flow, decreases payment cycle times and considerably reduces A/P overhead. In addition, the automation of cost monitoring and purchase approval of complex oil field products and services significantly decreases data processing and interpretation errors.

The Rules system 100 also provides vendors with the ability to check on payment status of their service tickets, thereby eliminating the need for operating companies to deal with vendor queries regarding service. Similarly, the Rules system 100 can be configured to automatically generate "Self billing Invoices" by the operating company after approval of eField-Tickets™. In such an application, upon a user entering the eField-Ticket™ a rule would direct the business system to approve the ticket and upon approval, generate billing invoices (for example, via an interconnected A/P system). In one embodiment, the Rules system 100 provides the rules and logical operations necessary to review, approve, and direct the billing of invoices and other information.

The Rules system 100 is also suitably equipped with various other interfaces including e-mail notification throughout the approval process, especially if an EFT™ is held for payment. The Rules system 100 can also be used to monitor AFE v. Actual Costs and manage inventory as the well is drilled reducing the chance of cost over-runs. The Rules system 100 can be used to notify the appropriate personnel when over runs are imminent and/or after they occur. The Rules system 100 can also be configured to distribute company specific knowledge to multiple locations thereby enabling field personnel to diagnose problems as they arise. In such an embodiment, a rule may be created which directs routing of information based upon the input template or data type received by the business system or knowledge based management system (for example, as discussed in the patent applications incorporated by reference above). As such, the Rules system 100 enables managers, users and others to automatically or upon direction communicate mission critical knowledge to field personnel.

Similarly, the Rules system 100 can be utilized to implement best practice maintenance procedures. In one embodiment, the Rules system 100 assists field personnel in maintaining equipment in the field rather than returning it to the workshop and thereby avoids costly shipping charges and reduces workshop overhead charges. Furthermore, implementation and use of the Rules system 100 may significantly reduce expensive training costs since field personnel require less training to perform the same complex tasks (the information needed to perform such tasks may be accessed from databases and instructions/rules provided by the Rules system 100 for how to utilize such information to perform any desired repairs. Further, the Rules system 100 can cut the time spent on equipment maintenance by saving field personnel from relearning complex tasks that are only performed occasionally by providing interactive checklists that respond to inputted conditions and configurations.

In another embodiment, the Rules system 100 also can provide user defined access control to any given project, even remote ones, allowing all personnel to contribute as needed. The Rules system 100 may provide for the customization of user privileges and access controls. Access controls are designed to meet the primary goals of any security system. To ensure data confidentiality, integrity and accountability data entered into or accessed by the Rules system 100 (using the business system and/or the knowledge based management system) can be viewed and modified only by authorized users.

Further, all access and modification changes made to such data logged for auditing purposes In another embodiment, the Rules system 100 may enable business systems (for example, a procurement system) product to be company specific, on both the buyer and vendor sides. For example, buyer and vendor templates can be configured to be specific to a particular business unit, field, operation or end-user. In addition to personalization of the buyer and vendor templates, the Rules system 100 enables the eField-Tickets™ to be company specific—displaying a different EFT™ template for each service company or for different business units within a given company.

Accordingly, it can be seen that a Rules system 100 as disclosed variously herein may provide compliance to user defined best practices across a corporation, business units and/or a supply chain.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

The invention claimed is:

1. A system for developing rules utilized in a knowledge management system for validating a selected process having one or more parameters, comprising:
   a builder module for creating one or more new rules utilized to validate at least one parameter of the selected process, wherein the selected process comprises a complex transaction relating to a transfer of oilfield goods, oilfield services, or combinations thereof, and the one or more rules determine compliance of the at least one parameter of the complex transaction to reconcile errors, to facilitate adherence to an industry standard, or combinations thereof;
   a repository for storing the one or more rules; and
   a server for obtaining the one or more parameters relating to the selected process, said server retrieving the one or more parameters relating to the selected process, said server retrieving the one or more rules associated with the selected process from the repository and utilizing the one or more rules to validate the one or more parameters of the selected process, and permitting a user to selectively modify the one or more parameters of the selected process when the one or more parameters do not comply with the one or more rules.

2. The system of claim 1, wherein the one or more rules include one or more customizable rules having variable data fields.

3. The system of claim 1, wherein the builder module permits an administrator to build the one or more rules based on one or more industry standards related to the selected process.

4. The system of claim 1, wherein the builder module permits an administrator to build the one or more rules based on historical data related to the selected process.

5. The process of claim 1, wherein the builder module permits an administrator to build the one or more rules based on historical data related to the selected process.

6. The system of claim 1, wherein the builder module permits an administrator to modify the one or more rules to form modified rules to be stored in the repository.

7. The system of claim 1, wherein the repository is a relational database.

8. The system of claim 1, wherein the server compares the one or more parameters of the selected process to the one or more rules associated with the selected process, and if the one or more parameters comply with the one or more rules, the server provides an indication thereof.

9. The system of claim 1, wherein the server compares the one or more parameters of the selected process to the one or more rules associated with the selected process, and if the one or more parameters do not comply with the one or more rules, the server provides an indication thereof.

10. A method for developing rules for use with a knowledge management system for validating a selected process having one or more parameters, the method comprising:
creating one or more new rules utilized to validate at least one parameter of the selected process, wherein the selected process comprises a complex transaction relating to a transfer of oilfield goods, oilfield services, or combinations thereof, and the one or more rules determine compliance of the at least one parameter of the complex transaction to reconcile errors, to facilitate adherence to an industry standard, or combinations thereof;
storing the one or more rules in a repository;
obtaining the one or more parameters relating to the process;
retrieving the one or more rules associated with the process form the repository;
utilizing the one or more rules to validate the one or more parameters of the process; and
selectively modifying the one or more parameters of the selected process when the one or more parameters do not comply with the one or more rules.

11. The method of claim 10, wherein the knowledge management system contains one or more industry standards related to the selected process, and the creating operation further comprises:
accessing the knowledge management system to create the one or more rules based in part on the one or more industry standards.

12. The method of claim 10, wherein the knowledge management system contains one or more government regulations related to the selected process, and the creating operation further comprises:
accessing the knowledge management system to create the one or more rules based in part on the one or more government regulations.

13. The method of claim 10, wherein the knowledge management system contains historical data related to the selected process, and the creating operation further comprises:
accessing the knowledge management system to create the one or more rules based in part on the historical data.

14. The method of claim 10, wherein the obtaining operation queries a user for the one or more parameters.

15. The method of claim 14, wherein the storing operation further comprises:
replacing the one or more rules with the one or more modified rules.

16. The method of claim 10, wherein the utilizing operation further comprises:
comparing the one or more parameters of the selected process to the one or more rules associated with the process, and if the one or more parameters comply with the one or more rules, providing an indication thereof.

17. The method of claim 10, wherein the utilizing operation further comprises:
comparing the one or more parameters of the selected process to the one or more rules associated with the process, and if the one or more parameters do not comply with the one or more rules, providing an indication thereof.

18. The method of claim 10, further comprising,
providing for an administrator to modify the one more rules to form one or more modified rules; and
storing the one or more modified rules in the repository.

19. The method of claim 10, wherein the one or more rules comprise a tolerance relating to an industry product or service for determining compliance of the at least one parameter within the tolerance to facilitate reconciling of errors, adherence to a industry standard, or combinations thereof.

20. The method of claim 10, wherein the one or more rules comprise a tolerance relating to pricing of a contract, pricing of an order or requisition, or combinations thereof, for determining compliance of the at least one parameter within the tolerance to facilitate reconciling of errors.

21. The method of claim 10, wherein the one or more rules classify the at least one parameter in accordance with a business requirement.

22. The method of claim 10, wherein the one or more rules cause at least one item of information relating to the at least one parameter to be transmitted to a selected user.

23. The method of claim 10, wherein the one or more rules comprise a tolerance relating to a time within which a payment, at least one requisitioned material, at least one item of information, or combinations thereof, is transmitted to a selected user.

24. A computer program product comprising:
a computer usable medium and computer readable code embodied on said computer usable medium for developing rules for use with a knowledge management system for validating a selected process having one or more parameters, the computer readable code comprising:
computer readable program code devices configured to cause the computer to effect a creating of one or more new rules utilized to validate at least one parameter of the selected process, wherein the process comprises a complex transaction relating to a transfer of oilfield goods, oilfield services, or combinations thereof, and the one or more new rules determine compliance of the at least one parameter of the complex transaction to reconcile errors, to facilitate adherence to an industry standard, or combinations thereof;
computer readable program code devices configured to cause the computer to effect a storing of the one or more rules in a repository;
computer readable program code devices configured to cause the computer to effect an obtaining of the one or more parameters relating to the selected process,
computer readable program code devices configured to cause the computer to effect a retrieving of the one or more rules associated with the selected process from the repository;
computer readable program code devices configured to cause the computer to effect a validating of the one or more parameters of the selected process against the one or more rules; and
computer readable program code devices configured to effect permitting of a user to modify the one or more parameters of the selected process when the one or more parameters do not comply with the one or more rules.

25. The computer program produce of claim 24, further comprising:
computer readable program code devices configured to cause the computer to effect a comparing of the one or more parameters of the selected process to the one or more rules associated with the process, and if the one or more parameters comply with the one or more rules, providing and indication thereof.

26. The computer program product of claim 24, further comprising:
computer readable program code devices configured to cause the computer to effect a comparing the one or more parameters of the selected process to the one or more rules associated with the process, and if the one or more parameters do not comply with the one or more rules, providing an indication thereof.

27. The method of claim 24, wherein the at least one rule comprises comprise a tolerance relating to an industry product or service for determining compliance of the at least one parameter within the tolerance to facilitate reconciling of errors, adherence to a industry standard, or combinations thereof.

28. The method of claim 24, wherein the at least one rule comprises a tolerance relating to pricing of a contract, pricing of an order or requisition, or combinations thereof, for determining compliance of the at least one parameter within the tolerance to facilitate reconciling of errors.

29. The method of claim 24, wherein the at least one rule classifies the at least one parameter in accordance with a business requirement.

30. The method of claim 24, wherein the at least one rule causes the validation of the at least one parameter to be transmitted to a selected user.

31. The method of claim 24, wherein the at least one rule comprises a tolerance relating to a time within which a payment, at least one requisitioned material, at least one item of information, or combinations thereof, is transmitted to a selected user.

32. A method for evaluating parameters of a complex transaction using a plurality of rules adapted for application to the parameters, the method comprising the steps of:
gathering data intelligence by a user relating to the parameters of the complex transaction from a repository;
creating by the user at least one customized rule adapted for application to at least one parameter of the complex transaction, wherein the complex transaction relates to a transfer of oilfield goods, oilfield services, or combinations thereof, and the at least one rule determines compliance of the at least one parameter of the complex transaction to reconcile errors, to facilitate adherence to an industry standard, or combinations thereof;
storing by the user the at least one customized rule in the repository;
retrieving the at least one rule from the repository;
processing the at least one rule to determine the at least one parameter required by the at least one rule;
retrieving the at least one parameter required by the at least one rule from the repository;
applying the at least one rule to the at least one parameter;
receiving by the user a validation of the at least one parameter indicating compliance of the at least one parameter with the at least one rule;
selectively modifying by the user the at least one parameter of the complex transaction; and
selectively modifying by the user the at least one customized rule.

33. The method of claim 32, further comprising the step of testing by the user the at least one rule.

34. The method of claim 32, further comprising the step of restricting modification of the at least one parameter, the at least one customized rule, or combinations thereof, based on an access level of the first user.

35. The method of claim 32, further comprising the step of receiving by the user at least one recommended change to the at least one rule, the at least one parameter, or combinations thereof.

36. The method of claim 32, wherein the at least one rule is adapted to reconcile a list price of the complex transaction, a negotiated contract price of the complex transaction, or combinations thereof.

37. The method of claim 32, wherein the at least one rule comprises an electronic invoice, and wherein the at least one parameter comprises a charge, a receipt document, or combinations thereof.

38. The method of claim 32, wherein the at least one rule is adapted to identify opportunities to pay for the complex transaction early to obtain a discount.

39. The method of claim 32, wherein the at least one rule comprises comprise a tolerance relating to an industry product or service for determining compliance of the at least one parameter within the tolerance to facilitate reconciling of errors, adherence to a industry standard, or combinations thereof.

40. The method of claim 32, wherein the at least one rule comprises a tolerance relating to pricing of a contract, pricing of an order or requisition, or combinations thereof, for determining compliance of the at least one parameter within the tolerance to facilitate reconciling of errors.

41. The method of claim 32, wherein the at least one rule classifies the at least one parameter in accordance with a business requirement.

42. The method of claim 32, wherein the at least one rule causes the validation of the at least one parameter to be transmitted to a selected user.

43. The method of claim 32, wherein the at least one rule comprises a tolerance relating to a time within which a payment, at least one requisitioned material, at least one item of information, or combinations thereof, is transmitted to a selected user.

* * * * *

(12) INTER PARTES REEXAMINATION CERTIFICATE (1099th)

United States Patent
Chikirivao et al.

(10) Number: US 7,669,133 C1
(45) Certificate Issued: May 1, 2015

(54) SYSTEM AND METHOD FOR DEVELOPING RULES UTILIZED IN A KNOWLEDGE MANAGEMENT SYSTEM

(75) Inventors: Bill S. Chikirivao, Denver, CO (US); Jeff A. Livesay, Houston, TX (US)

(73) Assignee: WELLOGIX TECHNOLOGY LICENSING, LLC, Houston, TX (US)

Reexamination Request:
No. 95/001,397, Jul. 16, 2010

Reexamination Certificate for:
Patent No.: 7,669,133
Issued: Feb. 23, 2010
Appl. No.: 10/125,120
Filed: Apr. 17, 2002

Related U.S. Application Data (60) Provisional application No. 60/359,923, filed on Feb. 25, 2002, provisional application No. 60/284,068, filed on Apr. 16, 2001, provisional application No. 60/284,077, filed on Apr. 16, 2001.

(51) Int. Cl.
| | |
|---|---|
| *G06F 3/00* | (2006.01) |
| *G06N 5/00* | (2006.01) |
| *G06N 5/02* | (2006.01) |

(52) U.S. Cl.
CPC ..................................... *G06N 5/022* (2013.01)

(58) Field of Classification Search
None
See application file for complete search history.

(56) References Cited

To view the complete listing of prior art documents cited during the proceeding for Reexamination Control Number 95/001,397, please refer to the USPTO's public Patent Application Information Retrieval (PAIR) system under the Display References tab.

*Primary Examiner* — Rachna Desai (57) ABSTRACT

A system and method for developing rules for validating a process having one or more parameters. The system or method may be used with a knowledge management system to validate the process. In one example, one or more rules are created to be used to validate the process, and the one or more rules are stored in a repository. One or more parameters relating to the process are obtained, one or more rules associated with the process are obtained from the repository, and the one or more rules obtained are used to validate the one or more parameters of the process. If the one or more parameters comply with the one or more rules, an indication thereof may be provided. Or if the one or more parameters do not comply with the one or more rules, an indication thereof may be provided.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-43 are cancelled.

\* \* \* \* \*